United States Patent [19]
Cadd et al.

[11] Patent Number: 5,691,979
[45] Date of Patent: Nov. 25, 1997

[54] SIGNALING PROTOCOL FOR AN INFRASTRUCTURELESS COMMUNICATION SYSTEM AND METHOD OF USING SAME

[75] Inventors: Jimmy W. Cadd, Coral Springs; Tracy L. Fulghum, Sunrise, both of Fla.

[73] Assignee: Motorola, Inc., Schaumburg, Ill.

[21] Appl. No.: 625,474

[22] Filed: Mar. 29, 1996

Related U.S. Application Data

[63] Continuation-in-part of Ser. No. 251,441, May 31, 1994, abandoned.

[51] Int. Cl.$^6$ .............................. H04J 4/00; H04B 1/713
[52] U.S. Cl. .................... 370/312; 370/342; 370/345; 370/445; 455/49.1; 375/202
[58] Field of Search ..................... 370/310, 312, 313, 314, 342, 343, 345, 349, 445; 375/202; 379/58, 63; 455/39, 49.1, 62, 68, 69

[56] References Cited

U.S. PATENT DOCUMENTS

| | | | |
|---|---|---|---|
| 5,379,290 | 1/1995 | Klejine | 370/313 |
| 5,404,374 | 4/1995 | Mullins et al. | 375/200 |
| 5,422,952 | 6/1995 | Kennedy et al. | 370/342 |
| 5,471,503 | 11/1995 | Altmaier et al. | 375/202 |

OTHER PUBLICATIONS

IEEE Transactions on Vehicular Technology, vol. 41, No. 1 Feb. 1992, pp. 24–34.

*Primary Examiner*—Hassan Kizou
*Attorney, Agent, or Firm*—Frank M. Scutch, III

[57] ABSTRACT

A signaling protocol for an infrastructureless short range communication system uses slow frequency hopping compatible with the industrial/scientific/medical (ISM) frequency spectrum. The signaling protocol utilizes a multi-tiered structure having an acknowledgment request frame (200), ping frame (300), connect frame (400) and voice frame (500). These frames are used to determine an appropriate allocation of frequency spectrum from an initiating station (11') to at least one other non-initiating station (11). The signaling protocol allows an initiating station (11') to rapidly identify other stations (11) within a talk group (13) and resolve actual and/or potential collisions to establish clear and reliable infrastructureless communication.

19 Claims, 4 Drawing Sheets

COMMUNICATION SYSTEM

SPECTRUM REQUIREMENTS

ACK CHANNELS

CONNECT CHANNELS

VOICE/ COMMUNICATION CHANNELS

ACK REQUEST FRAME

VOICE FRAME 500,691,979

SIGNALING PROTOCOL FOR AN INFRASTRUCTURELESS COMMUNICATION SYSTEM AND METHOD OF USING SAME

CROSS REFERENCE TO RELATED APPLICATIONS

This application is Continuation-in-Part of U.S. application Ser. No. 08/251,441, filed May 31, 1994 by Jim Cadd, entitled "APPARATUS AND METHOD USING A VOICE SLOT RESOLUTION SIGNALING PROTOCOL FOR AN INFRASTRUCTURELESS COMMUNICATIONS SYSTEM", and assigned to Motorola, Inc, now abandoned.

TECHNICAL FIELD

This invention relates in general to communications system signaling and more particularly to a protocol and method of achieving voice field resolution without system infrastructure.

BACKGROUND

Many short range radio frequency (RF) communications systems require the use of an infrastructure i.e. a central controller. Depending on the use and application of the system, it often may be desirous not to include the complexity of a central controller. The infrastructure often adds stability to a network however it is also expensive to implement and maintain requiring additional firmware and support systems.

In designing an infrastructureless system, there are several preferred features which should be included in the design. For example, the preferred infrastructureless system would use a slow frequency hopping technique compatible with the Industrial/Scientific/Medical (ISM) bands. This type of system would be analogous to systems using a network controller where each station is in the "talk around mode". This specific mode allows localized control without the need for centralized direction by a system controller. One problem associated with allowing many stations to use the talk around mode is that some type of frequency organization and allocation is needed between stations to prevent voice collisions and to maintain communication.

Many different types of systems have been envisioned to accomplish localized control without the need of an infrastructure. These types of systems all need to follow a number of essential operational parameters in order to insure the system's proper operation. These parameters essentially include the structure and techniques used to establish communication with any number of stations. Obviously, this entails developing a communications signaling protocol for station allocation. The preferred method would require a minimum of approximately 50 frequency hops with a maximum dwell of approximately 400 ms at only 1 watt of output power. It would also require methods to resolve collisions while using only a fixed amount of frequency spectrum with portable stations capable of allocating frequencies independently without the aid of a central controller. Additionally, the system would have a short range with point to point communication of approximately one-half mile in suburban environments. A preferred system would also use a type of carrier sense based signaling protocol with unique methods of resolving appropriate voice channels for multi-station groups. The system and signaling protocol should be capable of establishing an initial connection between stations and resolve any conflicts which may occur. A system following these constraints must convey to the stations the allocated frequencies for voice communication to allow sustained, reliable and clear communication. In view of the benefits involved in using a infrastructureless system, the need exists for such a design and its implementation utilizing all of these preferred techniques.

DETAILED DESCRIPTION OF THE PREFERRED EMBODIMENT

Figure 1:
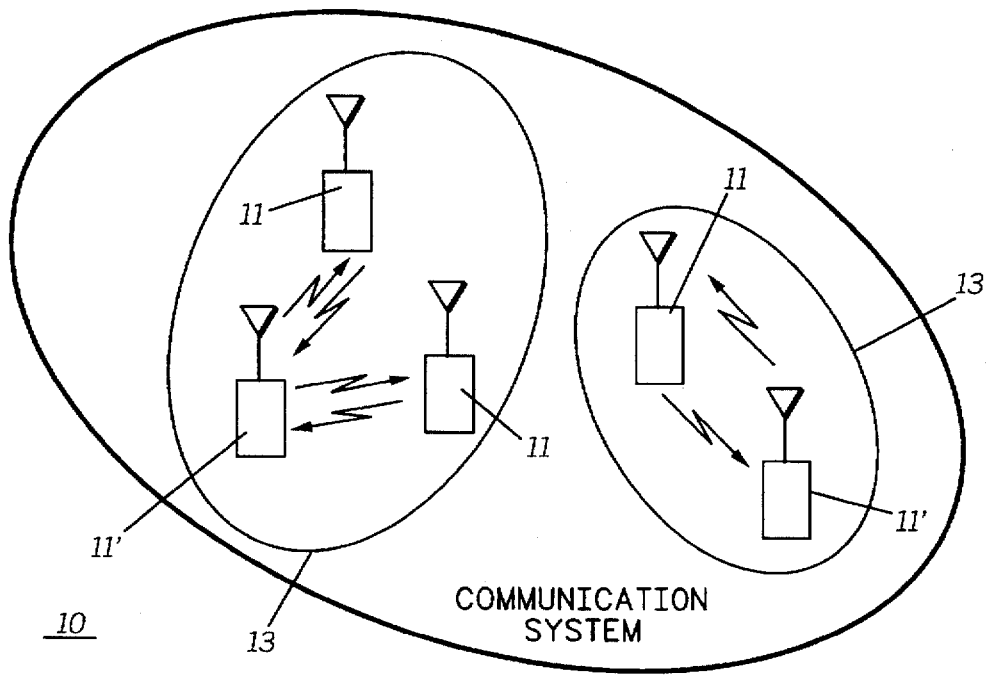
FIG. 1 is a block diagram illustrating a communication system utilizing a signaling protocol according to the preferred embodiment of the invention.

Referring now to FIG. 1, a wireless infrastructureless communication system 10 illustrating the preferred structure of the invention includes initiating stations 11' and one or more additional target stations 11 that are subdivided into one or more talk groups 13 for communicating messages in a pseudo-duplex mode. A target station 11 is defined as a station which has been solicited by a initiating station 11' to begin communication. The talk groups 13 are configured prior to communication and are fixed until re-configured by assigning a unique group identification (ID) to each talk group 13.

As described hereinafter, each talk group 13 is identified by a unique (ID) which is chosen at the time of configuration. The talk group 13 also chooses an acquisition channel or ACK channel at the time of configuration. As seen in FIG. 1, each talk group 13 operates in an infrastructureless environment without the benefit of any centralized control. As will be evident to those skilled in the art, the communication system 10 can be operated in a wide range of environments including wide area urban, suburban and in-building. The utility of the radio links established can include both digital voice and data communication.

Figure 2:
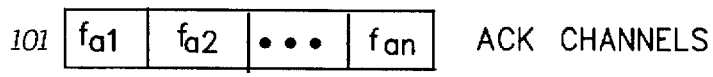
FIG. 2 is a block diagram showing the spectrum requirements for the acknowledgment, connect and communications channels used in the system shown in FIG. 1.
Figure 2:
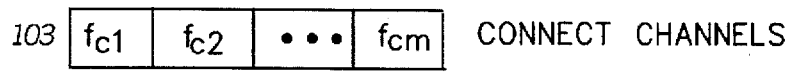
Figure 2:
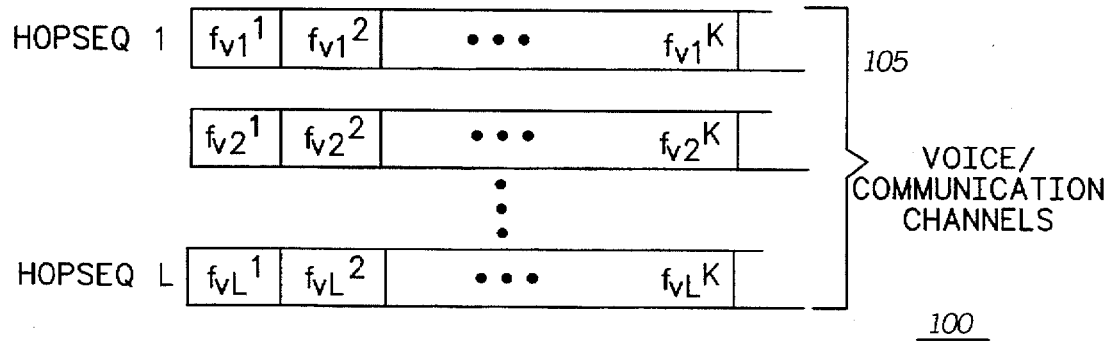

In FIG. 2, a block diagram illustrates parsing of the frequency spectrum 100 used by the talk groups 13 shown in FIG. 1. Each station 11 in a talk group 13 communicates using a protocol which supports slow frequency hopping. The spectrum has been divided into several types of channels namely acknowledgment (ACK) channels 101, connect channels 103, and voice/communications channels 105.

The ACK channels 101 are the fewest in number and work to provide control channel functionality. As seen in FIG. 2, there are a number of ACK channels 101 available and each ACK channel may be shared by one or more talk groups 13. Normally however, one talk group 13 uses one ACK channel 101. Additionally, the ACK channels 101 are also used to detect and resolve collisions between stations 11 which occur in the system when more than one station 11, in a talk group 13, requests communication at the same time. As is well known in the art, a collision may be defined as the simultaneous transmission of an ACK request 203 by more than one station 11.

During operation, all stations 11 in each talk group 13 listen on their assigned ACK channel 101 for that group. Each station 11 may sense a request, in the form of a group ID, from others within their talk group 13 in order to initiate communication. It should be recognized, that very little time is spent by a station 11 on the ACK channel 101, therefore few ACK channels 101 are required in the communications system 10.

When talk groups are initially configured, one ACK channel 101 is specified for each talk group 13. As indicated above, a single ACK channel 101 may be specified for more than one talk group 13.

The connect channels 103, are used for communication within a talk group 13 to select a compatible communication channel typically used for voice communication. It will be recognized that since the amount of time required to select a communication channel is longer than the typical dwell time on a ACK channel 101, more connect channels 103 are required than ACK channels 101 to accommodate the same traffic. The directive command as to which connect channel 103 to be used is conveyed, by an initiating station 11', to all others within the talk group 13 while on the ACK channel 101.

While on the connect channel 103 a talk group 13, under the direction of an initiating station 11', will resolve a mutually acceptable communication channel 105. A communications channel 105 is defined as a single frequency division multiplexed (FDM) channel. Multiple communication channels are combined to form a sequence of channels. This sequence of channels is referred to as a frequency hopping sequence or HOPSEQ as referred to in FIG. 2. After the talk group 13 has resolved a communication channel 105, all members of the talk group 13 will switch to that communications channel 105 and begin communication using a slow frequency hopping protocol over the sequence of communication channels. As seen in FIG. 2, L hopping sequences are available which can be used by the talk group 13. Each of the L hopping sequences are composed of K communication channels in the set where L and K represent integers greater than 1. After the talk group 13 hops on the set of K communication channels, the sequence is repeated for the duration of the communication.

Figure 3:
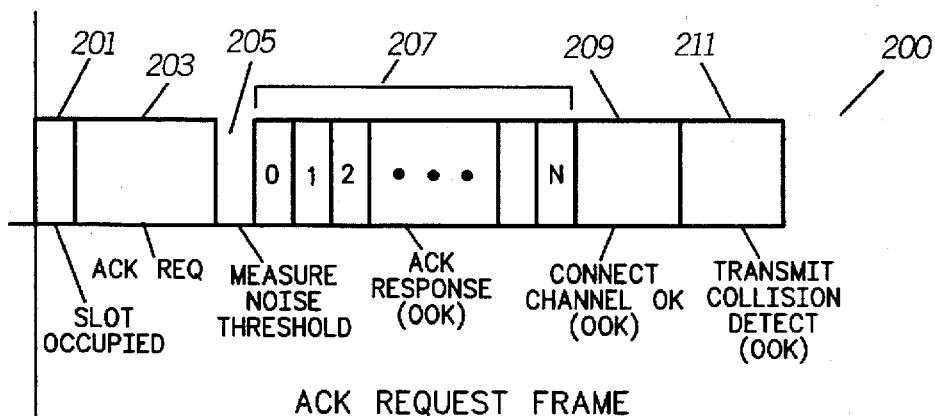
FIG. 3. is a diagram illustrating the fields within an acknowledgment request frame.
Figure 4:
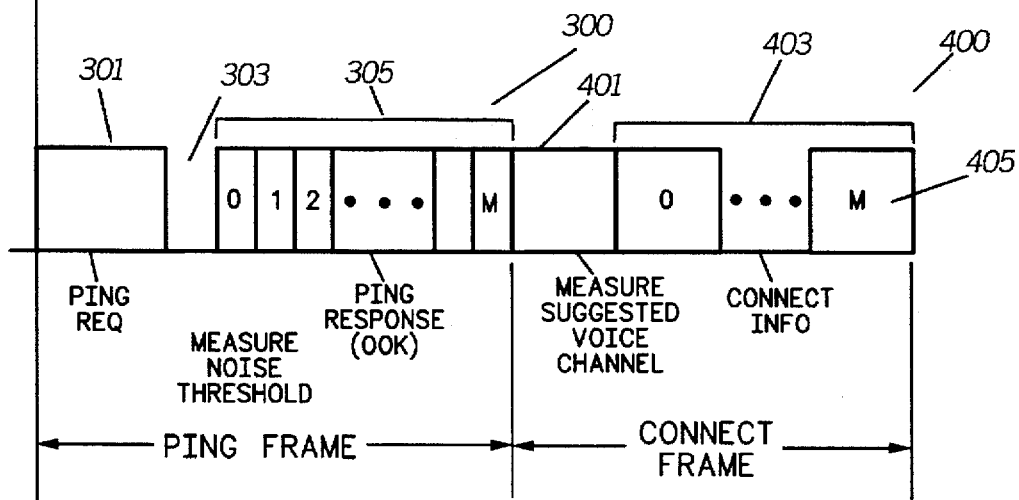
FIG. 4. is a diagram illustrating the fields within a ping frame and connect frame.
Figure 5:
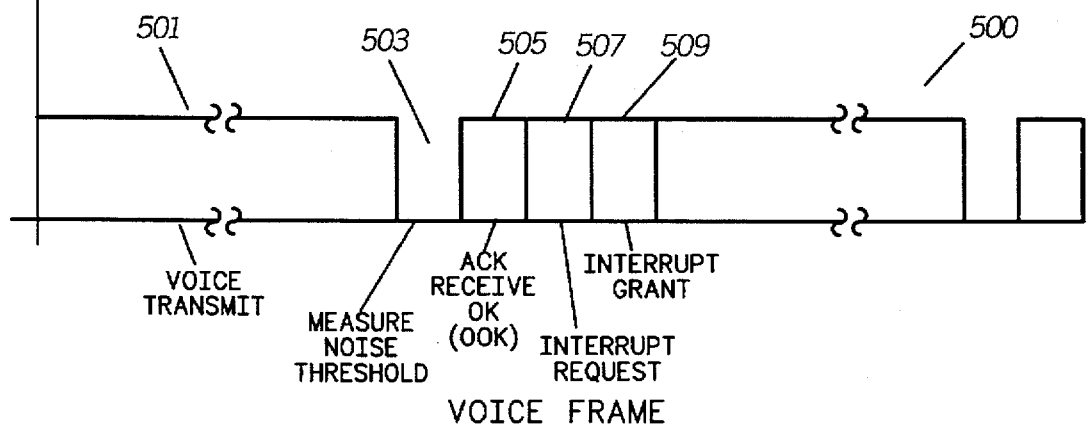
FIG. 5. is a diagram illustrating the fields within a voice frame.

FIGS. 3, 4 and 5 illustrate in detail the series of frames which are implemented or transmitted on the ACK channel 101, connect channel 103 and communications channel 105. A frame is defined as a collection of fields which are used by both the target stations 11 and initiating station 11' to convey and/or detect information which occur asynchronously amongst different talk groups 13. These frames are transmitted utilizing one or more standard modulation techniques such as frequency modulation (FM) or phase shift keying (PSK). It will also be recognized by those skilled in the art that on-off keying (OOK) modulation is used for specific signaling requirements.

Specifically in FIG. 3, the ACK request frame 200 is executed on the ACK channel 101. The ACK request frame 200 consists of a slot occupied field 201 that is used by the initiating stations 11' whom are participating in collision resolution process for resolving a collision. An ACK request field 203, transmitted by an initiating station 11', is used for sending a group identification, ACK word and suggested connect channel information to target stations 11.

Additionally, the ACK request frame 200 further includes a noise measurement threshold field 205, used by the initiating station 11' and target stations 11, for setting a decision threshold which is used by the initiating station 11' and target stations 11 for detecting channel activity. The ACK response field 207 is used by both the initiating station 11' and target station 11 for collision detection while a connect channel OK field 209 is used by the target stations 11 to indicate to the source station 11' that a suggested connect channel is clear and available. Finally, a transmit collision detect field 211 is used by either an initiating station 11' or target station 13 for disseminating throughout the communications system 10 that a collision has occurred on the ACK channel 101.

The ACK request field 203 is composed of identification information which identifies the talk group 13, a suggested connect channel 103 and an ACK word which is used to detect collisions on the ACK channel 101. The ACK word is a binary word, chosen randomly by an initiating station 11', and is N+1 bits long, where N defines a predetermined size of the ACK word 101 and represents an integer greater than zero.

Each bit in the ACK word corresponds to a field in the ACK response field 207 (fields O–N). If the binary level of a bit in the ACK word is 1, any target stations 11 in a talk group 13 are to respond by transmitting a carrier in the corresponding field of the ACK response field 207. The most significant bit in the ACK word corresponds to the lower fields in the ACK response field 207 but it will be recognized by those skilled in the art that it could be any bit position. If the binary level of a bit is 0, the target stations 11 in a talk group 13 are to respond by not transmitting in the associated field. In this way the ACK response field 207, used by the target stations 11 responding to the initiating station 11', will consist of a series of on-off carrier transmissions (OOK).

Using this technique, if a carrier exists in an ACK response field 207, and is detected by either a target station 11 or initiating station 11', and is designated as a no carrier field—then a collision will have occurred. The fields in the ACK response 207, with multiple carriers, will result in an addition of power at the receiver, improving the detection probability.

The transmit collision detect field 211 is used by either the initiating station 11' or target stations 11 to indicate to others in the talk group 13 that a collision has occurred. Since the communications system 10 is wireless, there may be instances when a frame received at one target station 11 is different than that of another station 11. Thus, all collisions may not be detected at a specified station 11 even through they have occurred. In order to help with this occurrence, the connect channel OK field 209 is used to convey to an initiating station 11' that a suggested connect channel 103, conveyed to the target station(s) 11, in the ACK request field 203, is available for use as measured by the target station 11.

In the preferred embodiment of the invention, the presence of a carrier in the connect channel OK field 209, indicates that the suggested connect channel 103 is not available for use. During operation, a target station 11 measures activity on the suggested connect channel 103 after reception of the ACK request field 203 during a portion of the time period designated as the noise measurement threshold field 205. The transmit collision detect field 211 is used to notify all users of the system that a collision has been detected. All initiating stations 11' and all target stations 11, which responded in the ACK response field 207 of the ACK frame, that detected a collision, will transmit a carrier during the collision detect field 211. If a collision was not detected by the initiating station 11' or a station responding to the ACK request, but a transmit collision detect field 211 was verified as having a carrier present, the station will transmit for the duration of the TRANSMIT COLLISION DETECT FIELD 211, thus echoing to the system that a collision has occurred. It will be recognized that the first field in the ACK request frame 200 is the slot occupied field 201 that is used only during the collision resolution process. As is well known in the art, many collision resolution techniques exist for handling collisions amongst stations in a group however the techniques for determining how the collision is resolved are not within the scope of this invention.

In short, the ACK request field 203 enables initial communication to target stations 11 using a unique group ID, a suggested connect channel and a randomly selected ACK word. The ACK response field 207 is used for collision detection. The initiating station 11' receives an ACK response field 207 from a target station 11 in the form of an OOK transmission which will enable collision detection amongst talk groups 13. The target station 11 also transmits back to the initiating station 11', in the form of OOK modulation, the status of the suggested connect channel 103. Additionally the ACK request frame 200 provides a means of disseminating the collision status of the channel in the transmit collision detect field 211.

The information to be conveyed on the connect channel 103 is illustrated in the FIG. 4 and consists of a ping frame 300 and a connect frame 400. The ping frame 300 is used to identify stations 11 in the talk group 13 which received the ACK request field 203. With a talk group 13 whose size is greater than two, an initiating station 11' is not aware of how many respondents there were in the ACK response field 207. This occurs since the OOK signaling from a target station 11 to the initiating station 11' is capable of receiving only composite (additive power from all transmitters) binary information.

The initiating station 11' initially transmits a ping request 301. All target stations 11, which receive the ping request 301, will respond during the ping response field 305. The ping response field 305 is divided up into M+1 fields where M is an integer greater than 0. Each target station 11 is assigned a number from 0–(M–1) when the stations 11 are initially configured. The number which is assigned to the target station 11 determines in which field that station will respond in the ping response field 305. In this manner all stations within the talk group 13 can be individually identified. Also, during the ping request 301, the initiating station 11' sends a suggested voice channel to be used. After the ping response field 305 is transmitted by the target stations 11, in the talk group 13, each target station 11 measures the suggested voice channel field 401, in the connect frame 400, for activity as shown in FIG. 4.

Thereafter, all target stations 11 respond in the same order used in the ping response field 305 to the initiating station 11' during the connect info fields. Each target station 11 conveys the status of the communications channel 105 which was measured (i.e. active or inactive) during the measure suggested voice channel time period 401. During the measure suggested voice channel time period 401, the initiating station 11' will monitor other potential voice communications channels 105 in the event the suggested communications channel 105 is not acceptable to the talk group 13. If the communications channel 105 is mutually agreed upon by all stations, the initiating station 11' will notify the talk group 13 during the Mth connect info field 405 illustrated in FIG. 5. If no communications channel 105 is mutually agreed upon, the initiating station 11' will suggest a new communications channel and the connect frame 400 will be repeated. This process will continue until a communications channel 105 is found or a time out occurs. Therefore, the connect channels 209 are used to determine which target stations 11 within the talk group 13, are available for communication and to determine an open communications channel 105, which is acceptable to all in the talk group 13.

After a communications channel 105 is found for the talk group 13, the voice frame 500 is executed on each hop in a frequency hopping sequence. The voice frame 500 consists of a voice transmit field 501, a measure noise threshold field 503, a receive ACK field 505 (from the target station 11), an interrupt request field 507 and an interrupt grant field 509. The voice transmit field 501 is used to communicate user information from the initiating station 11' to the target stations 11. If the target station 11 receives this information correctly the target station 11 will respond by transmitting an unmodulated carrier signal to the source station 11 in the ACK receive field 505.

In the event an interrupt request 507 has been sensed by a target station 11, that is the target station 11 wishes to become the initiating station 11' using pseudo duplex operation, the target station 11 will transmit an interrupt request 507 in the interrupt request field 509 to the initiating station 11'. If this is decoded correctly by the initiating station 11', the initiating station 11' may issue an interrupt grant in the interrupt grant field 509 which includes the assigned number of the target station 11 requesting the interrupt. On a subsequent voice frame 500 the requesting target station 11 will become the initiating station 11' for the talk group 13. Communication will continue in this manner until disconnected by a an initiating station 11'.

Figure 6:
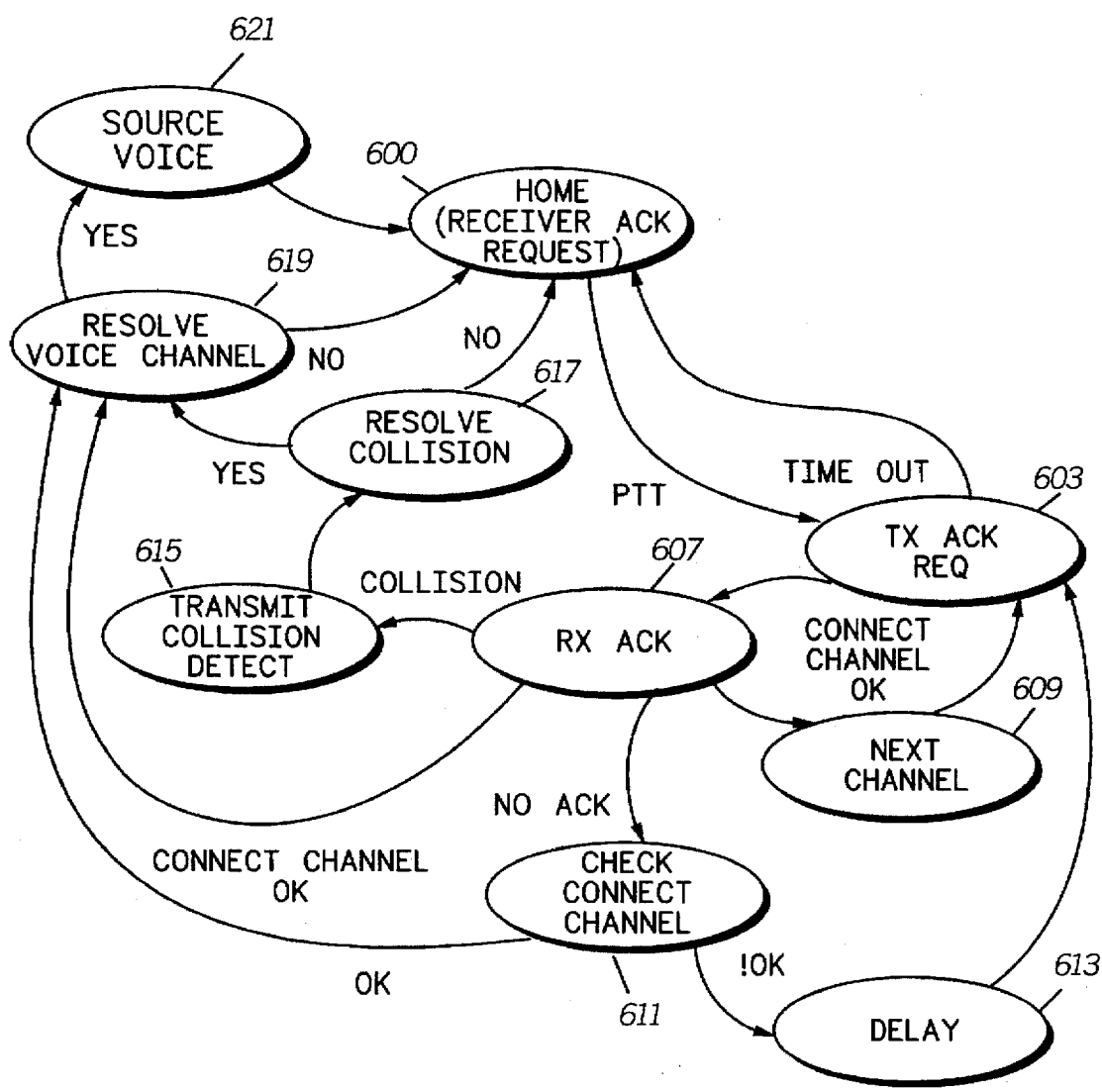
FIGS. 6 and 7 are state diagrams illustrating a method of communicating in an infrastructureless short range communications system for both an initiating state and non-initiating state within a group.
Figure 7:
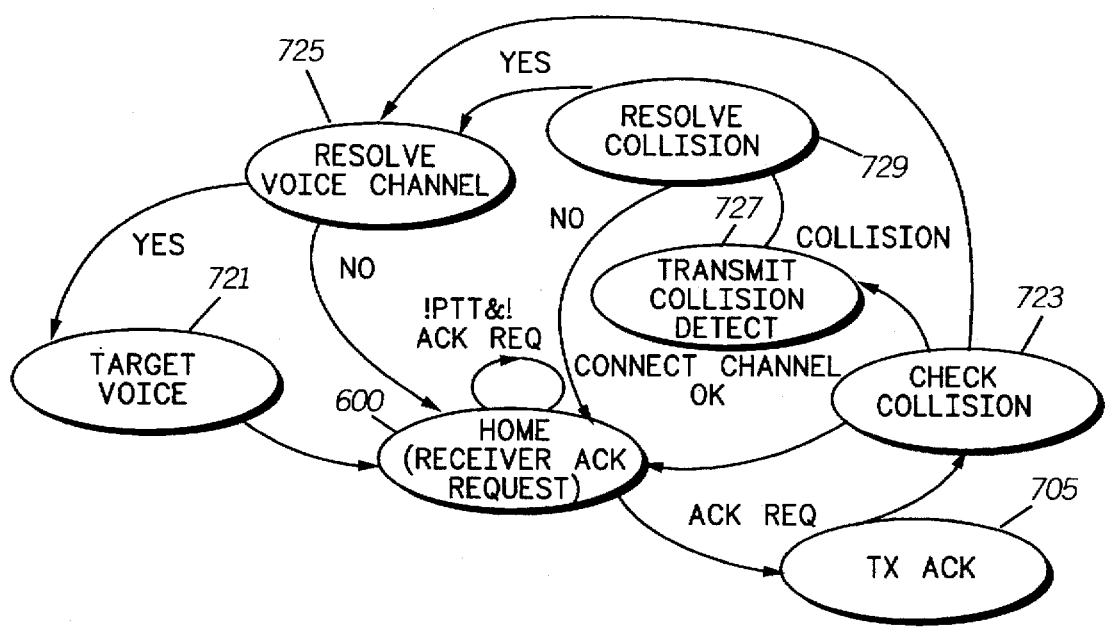

With regard to the preferred method of practicing the invention, a diagram is shown in FIGS. 6 and 7 which indicates the method of utilizing the signaling protocol of the present invention. The method uses a short range communication system signaling protocol for both an initiating station 11' and non-initiating or target station 11 within a select talk group 13. The protocol is capable of use in a wireless communications system using voice and data transmission. It will be realized that before voice communication begins, an initiating station first listens to a voice channel and a connect channel, using carrier sense techniques, for activity on the channel. The listening duration is sufficient to insure that transmission holes or gaps in a frame are not interpreted as a vacant channel. Transmission holes may be defined as portions of a transmission cycle when no one is transmitting.

All stations reside in the HOME 600 monitoring the ACK channel 101 assigned to the talk group 13 for an ACK request. A station will exit this if a push-to-talk (PTT) is sensed or an ACK request is received. If the PTT is sensed the station will become an initiating station 11' and switch to TX ACK REQ 603 and transmit an acquisition request. The initiating station 11' will then monitor the channel in RX ACK 607, receiving the ACK response and connect channel OK portions of the ACK request frame 200. If the connect channel is OK and no collision is detected, the initiating station 11' will switch to RESOLVE VOICE CHANNEL 619.

If a collision was detected during reception of the ACK response 207 or channel activity is detected during the transmit collision detect field 211 of the ACK frame 200, the initiating station 11' will switch to TRANSMIT COLLISION DETECT 615 and transmit an unmodulated carrier in that time slot and subsequently switch to RESOLVE COLLISION 617. If the collision is resolved the initiating station 11' will continue to RESOLVE VOICE CHANNEL 619, otherwise the communication will be considered blocked and the initiating station 11' will return to HOME 600. Upon going to the RX ACK 607, if no ACK response 207 is received, the initiating station 11' will transition to the CHECK CONNECT CHANNEL 611, transmit a ping request 301 and thereafter monitor for talk group 13 activity in the ping response field 305.

If the group responds, the initiating station 11' will transition to RESOLVE VOICE CHANNEL 619 else the initiating station 11' will transition to DELAY 613, execute a random delay, return to TX ACK REQ 603 and repeat the process unless a time out is encountered. If a time out is encountered, the initiating station 11' will be considered blocked and return to HOME 600. Also from the RX ACK 607, if the connect channel is not adequate (activity detected on the channel by target stations 11), the initiating station 11' will search for a vacant connect channel in NEXT CHANNEL 609, then return to TX ACK REQ 603 and repeat the sequence unless a time out occurs.

After the initiating station 11' reaches the RESOLVE VOICE CHANNEL 619, the ping frame 300 and connect frame 400 are executed to determine a common available channel in a hopping sequence. This procedure amounts to executing the ping frame 300 once and then the connect frame 400 until all target stations 11 agree on a voice channel. If agreement is reached the initiating station 11' transitions to SOURCE VOICE 621 and begins communication else the initiating station 11' is considered blocked and returns to the HOME 600. Once in the SOURCE VOICE 621, the voice frame 105 is executed as previously described.

The initiating station 11' may exit the SOURCE VOICE 621 if a disconnect occurs, (release of PTT), an interrupt grant 509 occurs or the link fails. In the first and last cases the initiating station 11' returns to HOME 600. If an interrupt grant 509 occurs the initiating station 11' will transition to the TARGET VOICE 721 and function as a target station 11.

A target station 11 becomes target station 11 with the reception of an ACK request. The target station 11 then switches to TX ACK 705 and responds to the initiating station 11' by transmitting the ACK response 207. Once accomplished the target station 11 will transition to CHECK COLLISION 723. If a collision was detected during the off intervals of the ACK response 207 or is detected during the transmit collision detect portion of the ACK frame 200, the target station 11 will transition to TRANSMIT COLLISION DETECT 727 and transmit an unmodulated carrier for the duration of the transmit collision detect field 211 and move to resolve the collision in RESOLVE COLLISION 729. As with the initiating station 11', if successful in resolving the collision, the target station 11 will transition to RESOLVE VOICE CHANNEL 725 otherwise the target station 11 will return to the HOME 600.

Once in the RESOLVE VOICE CHANNEL 725, the target will execute the ping frame 300 and connect frame 400. Upon successful resolution of a voice slot the target station 11 will continue to TARGET VOICE 721 and begin execution of voice frames, else the target station 11 will return to HOME 600. The target station 11 may exit the TARGET VOICE 621 by receiving an interrupt grant 509, receiving a disconnect or link failure. A disconnect or link failure will result in a transition to HOME 600. If the target station 11 receives an interrupt grant 509 the target station 11 will become the initiating station 11' and transition to SOURCE VOICE 621 and function accordingly.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for initiating communication between a plurality of stations in a group in a wireless communication system having no centralized control, the method utilizing a signaling protocol utilizing a plurality of frames which are transmitted between an initiating station and at least one non-initiating station, the method for communicating comprising the steps of:

transmitting a first series of frames between the initiating station and the at least one non-initiating station for requesting and acknowledging establishment of communications;

transmitting a second series of frames between the initiating station and at least one non-initiating station for suggesting and measuring a suggested third frame used for voice or data communication for non-initiating stations in the group and for providing interim communication before transitioning to the third frame; and transmitting a third series of frames between the initiating station and the at least one non-initiating station for conveying voice or data communication.

2. A method of initiating communication as in claim 1 wherein the first series of frames includes a plurality of fields for initiating and responding to a request for communication and for indicating when a collision has occurred between stations in the group.

3. A method of initiating communication as in claim 2 wherein the second series of frames includes a plurality of fields for suggesting and verifying a channel to be used for voice or data communication.

4. A method of initiating communication as in claim 3 wherein the third series of frames includes a plurality of fields for exchanging voice or data information.

5. A method of utilizing a multi-frame signaling protocol for establishing communication between a group of stations in an infrastructureless communication system comprising the steps of:

sending a transmit request from an initiating station within the system to at least one non-initiating station within a talk group;

sending an acknowledgment from the at least one non-initiating station to the initiating station;

sending acknowledgment data from the initiating station to all of the stations within the talk group;

sending first connection data from the initiating station to all of the stations within the talk group;

sending second connection data from all of the stations in the talk group to the initiating station;

resolving an occupied communication channel data based on the second connection data by the initiating station;

sending resolved channel data from the initiating station to the at least one non-initiating station; and initiating voice or data communication on a resolved channel between the initiating station and the at least one non-initiating station.

6. A method of establishing communication according to claim 5 wherein the first connection data is used for suggesting channel availability.

7. A method of establishing communication according to claim 5 wherein the second connection data is used for indicating verification of a suggested channel.

8. A method of establishing communication according to claim 5 wherein the resolved channel data is used for indicating channel connection information.

9. A method of establishing communication according to claim 5 wherein the resolved channel is used for sustained voice or data transmission.

10. A signaling method for use in an infrastructureless communications system for communicating messages between an initiating station and at least one non-initiating station in a talk group, the signaling method utilizing a number of stations in the talk group for transmitting a plurality of unique frame types, the method comprising the steps of:

exchanging a series of first type frames between an initiating station and at least one non-initiating station for conveying transmit request information and receiving an acknowledgment;

exchanging a series of second type frames between the initiating station and the at least one non-initiating station for identifying and establishing all non-initiating stations to form a talk group;

exchanging a series of third type frames for measuring activity on a suggested voice channel and conveying connection information to all non-initiating stations in the talk group for use in transitioning to a communications channel; and exchanging a series of fourth type frames used for conveying voice or data communication on the communications channel between the initiating station and the at least one non-initiating station.

11. A signaling method for use in an infrastructureless communications system as in claim 10 wherein the step of exchanging a series of first type frames occurs on a first communications channel.

12. A signaling method for use in an infrastructureless communications system as in claim 11 wherein the step of exchanging a series of second type frames occurs on a second communications channel.

13. A signaling method for use in an infrastructureless communications system as in claim 12 wherein the step of exchanging a series of third type frames occurs also occurs on the second communications channel.

14. A signaling method for use in an infrastructureless communications system as in claim 13 wherein the step of exchanging a series of fourth type frames occurs on a third communications channel.

15. A signaling method for use in an infrastructureless communications system according to claim 10, wherein the step of exchanging a series first type frames further comprises the steps of:

providing at least one field within the series of first type frames containing communications request information, communications verification information and collision detection information.

16. A signaling method for use in a infrastructureless communications system according to claim 10, wherein the step of exchanging a series of second type frames further comprises the steps of:

providing at least one field within the series of second type frames for identifying and acknowledging establishment of communications between an initiating station and all non-initiating stations in a talk group.

17. A signaling method for use in a infrastructureless communications system according to claim 10, wherein the step of exchanging a series of third type frames further comprises the steps of:

providing at least one field within the series of third type frames for conveying connection information used for resolving identification of a voice or data channel.

18. A signaling method for use in a infrastructureless communications system according to claim 10, wherein the step of exchanging a series of fourth type frames further comprises the steps of:

providing at least one field with the series of fourth type frames for conveying voice or data information and interrupt information used a station receiving information desires to become a station transmitting information.

19. A signaling method for use in an infrastructureless communications system according to claim 18, wherein the voice or data information is communicated in a pseudo duplex mode.

* * * * *